US009557594B2

(12) United States Patent
Mo et al.

(10) Patent No.: US 9,557,594 B2
(45) Date of Patent: Jan. 31, 2017

(54) LIQUID-CRYSTAL DISPLAY SCREEN WITH TOUCH-CONTROL FUNCTION AND MANUFACTURING METHOD THEREOF AND ELECTRONIC APPARATUS

(71) Applicant: FocalTech Systems, Ltd., George Town, Grand Cayman (KY)

(72) Inventors: Lianghua Mo, Guangdong (CN); Xinxi Jiang, Guangdong (CN); Hua Li, Guangdong (CN); Peng Wang, Guangdong (CN)

(73) Assignee: FOCALTECH SYSTESM, LTD., George Town (KY)

( * ) Notice: Subject to any disclaimer, the term of this patent is extended or adjusted under 35 U.S.C. 154(b) by 490 days.

(21) Appl. No.: 13/942,508

(22) Filed: Jul. 15, 2013

(65) Prior Publication Data
US 2014/0204288 A1 Jul. 24, 2014

(30) Foreign Application Priority Data
Jan. 18, 2013 (CN) .......................... 2013 1 0020039

(51) Int. Cl.
*G02F 1/1335* (2006.01)
*G02F 1/1333* (2006.01)

(52) U.S. Cl.
CPC ................. *G02F 1/13338* (2013.01)

(58) Field of Classification Search
CPC ............ G02F 1/13338; G02F 1/133707; G06F 3/0412
(Continued)

(56) References Cited

U.S. PATENT DOCUMENTS 9,007,329 B2 * 4/2015 Lee et al. ....................... 345/174
2008/0100590 A1 * 5/2008 Hur ........................ G06F 3/0412
345/173
(Continued)

FOREIGN PATENT DOCUMENTS

CN 101925872 12/2010
CN 102760017 10/2012
(Continued)

OTHER PUBLICATIONS

102120181, May 6, 2015, Taiwanese Office Action and Partial English Translation.

*Primary Examiner* — Nathanael R Briggs
*Assistant Examiner* — William Peterson
(74) *Attorney, Agent, or Firm* — Workman Nydegger (57) ABSTRACT

The present invention discloses a liquid-crystal display screen with touch-control function and a manufacturing method thereof and an electronic apparatus. The liquid-crystal display screen includes a first sensing electrode and a second sensing electrode, which are included in a common electrode in display electrodes of the liquid-crystal display screen, and are connected to a touch detection unit. Furthermore, the touch detection unit and a display control unit operate in a timesharing manner. In this way, in the touch-control display screen, the common electrode may also be used as an electrode for detecting a touch on the touch-control display screen, and the structure of the display screen is simplified. Moreover, the touch-control display screen has a better light transmittance and the detecting for the touch and the control for the display may not interact with each other.

14 Claims, 6 Drawing Sheets (58) Field of Classification Search
USPC .......................................................... 349/12
See application file for complete search history.

(56) References Cited

U.S. PATENT DOCUMENTS

| | | | |
|---|---|---|---|
| 2010/0309167 | A1 | 12/2010 | Nam |
| 2011/0102732 | A1* | 5/2011 | Washizawa .................... 349/187 |
| 2012/0056835 | A1 | 3/2012 | Choo et al. |
| 2012/0218482 | A1 | 8/2012 | Hwang et al. |
| 2012/0274603 | A1* | 11/2012 | Kim et al. ..................... 345/174 |
| 2013/0127747 | A1 | 5/2013 | Ding et al. |
| 2014/0152602 | A1 | 6/2014 | Miyamoto et al. |
| 2014/0204287 | A1 | 7/2014 | Jiang et al. |

FOREIGN PATENT DOCUMENTS

| | | |
|---|---|---|
| CN | 102841718 | 12/2012 |
| CN | 103076935 | 5/2013 |
| JP | 2012079238 | 4/2012 |
| KR | 20120035874 | 4/2012 |
| TW | 201224903 | 6/2012 |
| TW | M431372 | 6/2012 |
| TW | 201248475 | 12/2012 |
| TW | 201305889 | 2/2013 |

\* cited by examiner

LIQUID-CRYSTAL DISPLAY SCREEN WITH TOUCH-CONTROL FUNCTION AND MANUFACTURING METHOD THEREOF AND ELECTRONIC APPARATUS

This application claims the priority of the Chinese Patent Application No. 201310020039.5, entitled "LIQUID-CRYSTAL DISPLAY SCREEN WITH TOUCH-CONTROL FUNCTION AND MANUFACTURING METHOD THEREOF AND ELECTRONIC APPARATUS", filed with the Chinese Patent Office on Jan. 18, 2013 which is herein incorporated by reference in its entirety.

FIELD OF THE INVENTION

The present invention relates to the technical field of electronic apparatus, and in particular to a liquid-crystal display screen with touch-control function (hereinafter referred to as a touch-control display screen for short) and a manufacturing method thereof and an electronic apparatus.

BACKGROUND OF THE INVENTION

With the development of the touch-control display technology, capacitive touch-control display screens have been applied more and more widely. The touch-control display screen of the existing electronic apparatus generally includes a display layer and a touch sensing layer. The display layer includes electrodes, such as a pixel electrode, a common electrode and a thin film transistor (TFT) array, for implementing a liquid-crystal display. The touch sensing layer includes an electrode for detecting a touch on the touch-control display screen. Generally, the touch sensing layer and the display layer are stacked from the top (the external surface direction of the electronic apparatus) to bottom of the touch-control display screen, so that the touch-control display function is implemented.

SUMMARY OF THE INVENTION

Embodiments according to the present invention provide a liquid-crystal display screen with touch-control function and a manufacturing method thereof and an electronic apparatus, by which the structure of the liquid-crystal display screen with touch-control function is simplified.

An embodiment according to the present invention provides a liquid-crystal display screen with touch-control function, including: a cover plate, a color light filter, a common electrode in display electrodes, a liquid-crystal layer, other display electrodes, a substrate and a backlight, which are stacked from top to bottom, the touch-control display screen further includes a touch detection unit and a display control unit;

where, the common electrode includes a first sensing electrode and a second sensing electrode;

the first sensing electrode and the second sensing electrode are connected to the touch detection unit, the touch detection unit is adapted to detect a self-capacitance formed between the first sensing electrode and the second sensing electrode or a mutual-capacitance formed between the first sensing electrode and the second sensing electrode, and to determine a touch on the touch-control display screen according to the detected self-capacitance or mutual-capacitance;

the common electrode and other display electrodes are all connected to the display control unit which is adapted to control the first sensing electrode, the second sensing electrode and the other display electrodes to perform a liquid-crystal display; and the display control unit and the touch detection unit operate in a timesharing manner.

An embodiment according to the present invention provides an electronic apparatus including a liquid-crystal display screen with touch-control function;

the liquid-crystal display screen with touch-control function including: a cover plate, a color light filter, a common electrode in display electrodes, a liquid-crystal layer, other display electrodes, a substrate and a backlight, which are stacked from top to bottom. The touch-control display screen further includes a touch detection unit and a display control unit;

where, the common electrode includes a first sensing electrode and a second sensing electrode;

the first sensing electrode and the second sensing electrode are connected to the touch detection unit, the touch detection unit is adapted to detect a self-capacitance formed between the first sensing electrode and the second sensing electrode or a mutual-capacitance formed between the first sensing electrode and the second sensing electrode, and to determine a touch on the touch-control display screen according to the detected self-capacitance or mutual-capacitance;

the common electrode and other display electrodes are all connected to the display control unit which is adapted to control the first sensing electrode, the second sensing electrode and the other display electrodes to perform a liquid-crystal display; and the display control unit and the touch detection unit operate in a timesharing manner.

An embodiment according to the present invention provides a manufacturing method for a liquid-crystal display screen with touch-control function, the liquid-crystal display screen with touch-control function including: a cover plate, a color light filter, a common electrode in display electrodes, a liquid-crystal layer, other display electrodes, a substrate and a backlight, which are stacked from top to bottom, the touch-control display screen further includes a touch detection unit and a display control unit;

where, the common electrode includes a first sensing electrode and a second sensing electrode;

the first sensing electrode and the second sensing electrode are connected to the touch detection unit, the touch detection unit is adapted to detect a self-capacitance formed between the first sensing electrode and the second sensing electrode or a mutual-capacitance formed between the first sensing electrode and the second sensing electrode, and to determine a touch on the touch-control display screen according to the detected self-capacitance or mutual-capacitance;

the common electrode and other display electrodes are all connected to the display control unit which is adapted to control the first sensing electrode, the second sensing electrode and the other display electrodes to perform a liquid-crystal display; and the display control unit and the touch detection unit operate in a timesharing manner.

Moreover, the method includes:

vacuum-sputtering an electrode material on the entire inner surface of the color light filter of the liquid-crystal display screen with touch-control function to form the common electrode; and etching the electrode material to form the common electrode including the first sensing electrode and the second sensing electrode.

In the embodiments according to the present invention, the first sensing electrode and the second sensing electrode, which are included in the common electrode in the display electrodes of the liquid-crystal display screen with touch-control function, are connected to the touch detection unit. Furthermore, the touch detection unit and the display control unit operate in a timesharing manner. In this way, in the touch-control display screen, the common electrode may also be used as an electrode for detecting the touch on the touch-control display screen. There is no need additionally arranging a touch sensing layer to carry the electrode for detecting the touch on the touch-control display screen. Therefore, the structure of the touch-control display screen is simplified. Moreover, the touch-control display screen has a better light transmittance since there is no touch sensing layer. Furthermore, the detecting for the touch and the control for the display may not interact with each other since the touch detection unit and the display control unit operate in a timesharing manner.

BRIEF DESCRIPTION OF THE DRAWINGS

The accompany drawings needed to be used in the description of the embodiments or the prior art will be described briefly as follows, so that the technical solutions according to the embodiments of the present invention or according to the prior art will become more clearer. It is clear that the accompany drawings in the following description are only some embodiments of the present invention. For those skilled in the art, other accompany drawings may be obtained according to these accompany drawings without any creative work.

DETAILED DESCRIPTION OF THE INVENTION

The technical solution according to the embodiments of the present invention will be described clearly and completely as follows in conjunction with the accompany drawings in the embodiments of the present invention. It is clear that the described embodiments are only a part of but not all of the embodiments according to the present invention. All the other embodiments obtained by those skilled in the art based on the embodiments in the present invention without any creative work belong to the scope of the present invention.

First Embodiment According to the Present Invention

Figure 1:
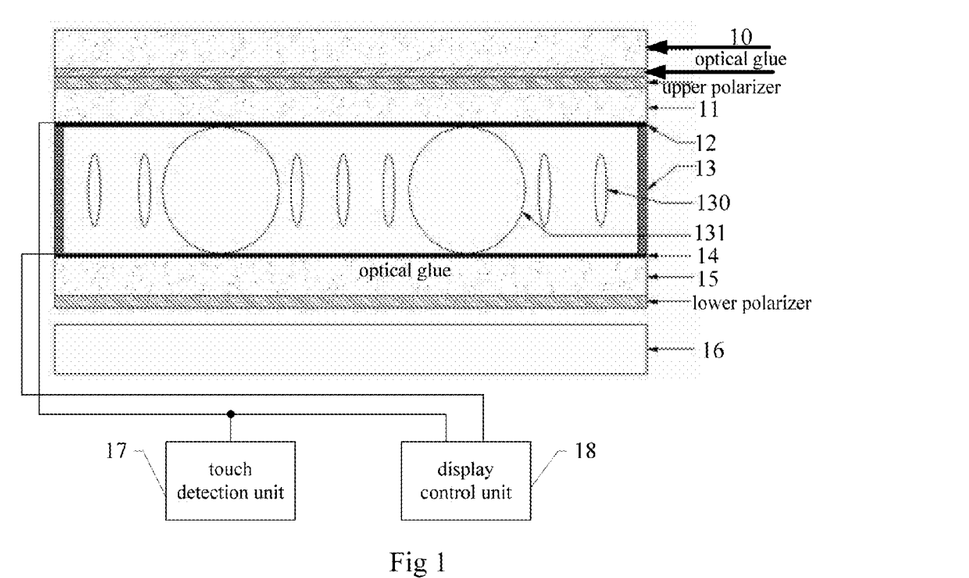
FIG. 1 is a schematic diagram of a structure of a liquid-crystal display screen with touch-control function provided in a first embodiment according to the present invention.

A liquid-crystal display screen with touch-control function (hereinafter referred to as a touch-control display screen for short) is provided, which is mainly of an In-cell type and so on. Among display electrodes in such type of liquid-crystal display screen, a common electrode and other display electrodes (such as a pixel electrode and a TFT) are not in the same layer and are separated by the liquid-crystal. The touch-control display screen is generally used in an electronic apparatus and a schematic diagram of the specific structure of the touch-control display screen is shown in FIG. 1, including:

a cover plate 10, a color light filter 11, a common electrode 12 in display electrodes, a liquid-crystal layer, other display electrodes 14, a substrate 15 and a backlight 16, which are stacked from top to bottom. The touch-control display screen further includes a touch detection unit 17 and a display control unit 18. An outer surface direction of the electronic apparatus is an up direction and an inner surface direction of the electronic apparatus is a down direction.

Polarizers are respectively arranged above the color light filter 11 and below the substrate 15 to change circularly polarized light into linearly polarized light, so as to achieve a liquid-crystal display. Specifically, an upper polarizer is arranged between the cover plate 10 and the color light filter 11, and the upper polarizer may be adhered to the inner surface of the cover plate 10 with transparent optical glue; and a lower polarizer is arranged between the backlight 16 and the substrate 15.

The color light filter 11 may allow a color picture to be displayed on the touch-control display screen. The color light filter 11 mainly includes a red light-filtering area, a blue light-filtering area and a green light-filtering area. The liquid-crystal layer includes liquid-crystal molecules 130 and spacer particles 131. The liquid-crystal molecules 130 and the spacer particles 131 may be arranged between the common electrode 12 in the display electrodes and the other display electrodes 14 by frame glue 13. Specifically, the spacer particles 131 may support the color light filter 11 to prevent the color light filter 11 from deforming and provide the liquid-crystal a certain space to rotate; the frame glue 13 is used to bond the color light filter 11 and the substrate 15 together to form a sealed space. The common electrode 12 and the other display electrodes 14 are electrodes for implementing the liquid-crystal display. The common electrode 12 includes a first sensing electrode 120 and a second sensing electrode 121. The common electrode 12 and the other electrodes 14 may be made of Indium Tin Oxides (ITO) which has good transparency and conductivity.

The first sensing electrode 120 and the second sensing electrode 121 are both connected to the touch detection unit 17. The touch detection unit 17 is adapted to detect a self-capacitance formed between the first sensing electrode 120 and the second sensing electrode 121 or a mutual-capacitance formed between the first sensing electrode 120 and the first sensing electrode 121, and to determine a touch on the touch-control display screen according to the detected self-capacitance or mutual-capacitance. The common electrode 12 and other electrodes 14 are all connected to the display control unit 18. The display control unit 18 is adapted to control the first sensing electrode 120, the second sensing electrode 121 and other display electrodes 14 to perform the liquid-crystal display. In the present embodiment, the touch detection unit 17 and the display control unit 18 may operate in a timesharing manner according to a preset arrangement. In another specific embodiment, another control unit is arranged and connected to the touch detection unit 17 and to the display control unit 18, so as to control the touch detection unit 17 and the display control unit 18 to operate in a timesharing manner. For example, when the display control unit 18 controls the display, the touch detection unit 17 stops detecting the touch on the touch-control display screen.

In the present embodiment, the other electrodes may include a pixel electrode, a signal electrode, a TFT or the like, and the pixel electrode is connected to the signal electrode via the TFT. When being in an operating status, the display control unit 18 may control the voltage of the first sensing electrode 120 in the common electrode 12 and the voltage of the second sensing electrode 121 in the common electrode 12 to be equal, so that the two electrodes are both taken as one electrode for the liquid-crystal display. Moreover, the display control unit 18 may control the TFT to be open. In this case the TFT is equivalent to two reverse-biased diodes connected together, and it is impossible for the current of the signal electrode to flow through the TFT to the drain electrode of the TFT. Since the pixel electrode is connected to the drain electrode of the TFT, it is also impossible for the current of the signal electrode to flow to the pixel electrode. Therefore, an electric field can not be established between the pixel electrode in the other display electrodes 14 and the common electrode 12, so that the light of the backlight 16 can not arrive at the upper polarizer after passing through the lower polarizer and arriving at the other display electrodes 14 and the common electrode 12 layer, and the touch-control display screen is black. The display control unit 18 may also control the TFT to be closed. Thus the current of the signal electrode flows through the TFT to the drain electrode of the TFT. In this case, an electric field is established between the pixel electrode in the other electrodes 14 and the common electrode 12, and the liquid-crystal molecules 130 in the liquid-crystal layer located on the other display electrodes 14 rotate under the influence of the electric field, so that the light of the backlight 16 may pass through the rotating liquid-crystal molecules 130 and the upper polarizer and finally arrive at the cover plate 10 after passing through the lower polarizer and arriving at the other electrodes 14. Thereby, the display control unit 18 controls the display electrodes and implements the liquid-crystal display. In addition to the above operating mode, there are further other operating modes which will not be described herein.

When being in an operating status, the touch detection unit 17 may control the voltage of the first sensing electrode 120 in the common electrode 12 and the voltage of the second sensing electrode 121 in the common electrode 12 to be different, so that the first sensing electrode 120 and the second sensing electrode 121 are respectively taken as one electrode of the self-capacitance or one electrode of the mutual-capacitance. In a specific implementation, there may be the following two manners for the first sensing electrode 120 and the second sensing electrode 121 in the common electrode 12, and correspondingly, the detecting of the touch on the touch-control display screen by the touch detection unit 17 also has two manners, specifically as follows.

Figure 2:
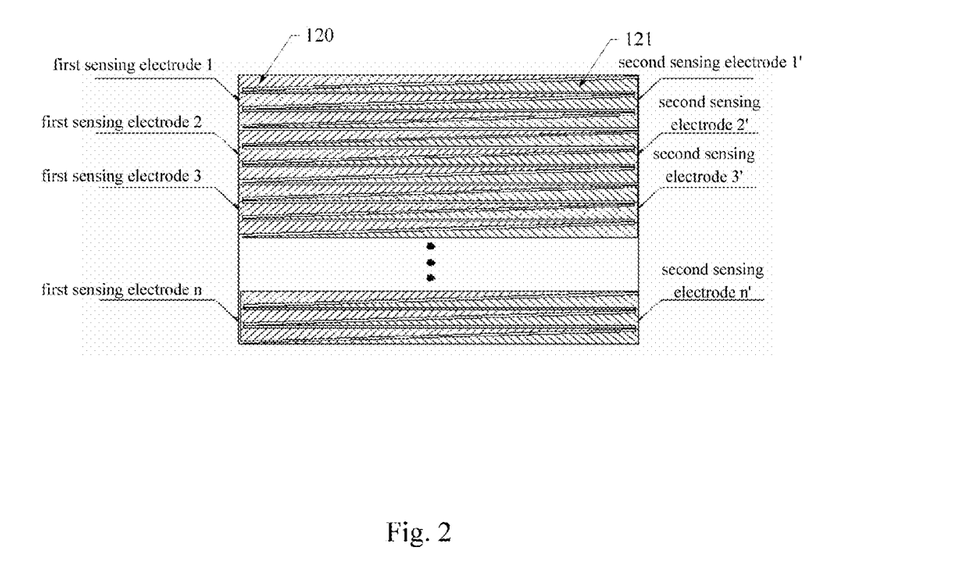
FIG. 2 is a pattern of a common electrode layer in a touch-control display screen provided in an embodiment according to the present invention.

(1) As shown in FIG. 2, the entire common electrode 12 may be divided into multiple pairs of blocks in different shapes, with each pair of blocks including one first sensing electrode 120 and one second sensing electrode 121. The first sensing electrode 120 and the second sensing electrode 121 may be in any shape. For example, in FIG. 2, the first sensing electrode 120 is multiple triangular electrodes with one edge of each of the triangular electrodes being connected together (the part filled with left oblique lines in FIG. 2), the second sensing electrode 121 is also multiple triangular electrodes with one edge of each of the triangular electrodes being connected together (the part filled with right oblique lines in FIG. 2). Moreover, the first sensing electrode 120 and the second sensing electrode 121 are not connected together, and the unconnected portions of the triangular electrodes of the first sensing electrode and the unconnected portions of the triangular electrodes of the second sensing electrode are arranged to fit each other. That is, the unconnected portions of the triangular electrodes included in one of the sensing electrodes are arranged in the interspaced portions of the other sensing electrode, thus the occupied area is saved. What FIG. 2 shows is only one of the specific implementations, and the first sensing electrode 120 and the second sensing electrode 121 may also have other shapes.

Figure 3:
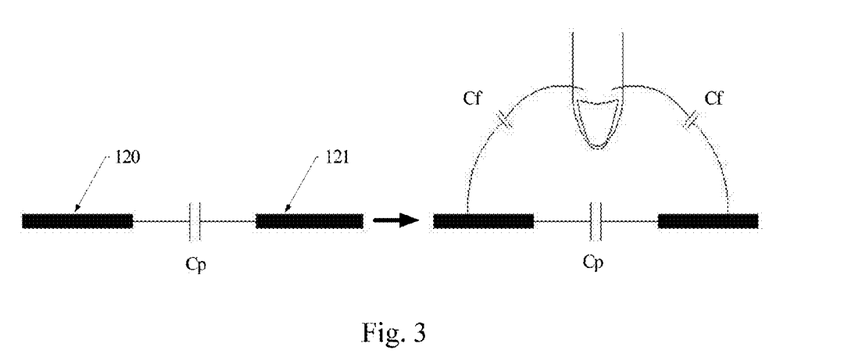
FIG. 3 is a schematic diagram of a capacitance formed between a first sensing electrode and a second sensing electrode when a touch detection unit operates in a touch-control display screen provided in an embodiment according to the present invention operates.

The touch detection unit 17 may provide a signal source for the two sensing electrodes, here the first sensing electrode 120 and the second sensing electrode 121, in each pair of blocks, so as to form a self-capacitance between the first sensing electrode 120 and the second sensing electrode 121. As shown in FIG. 3, if there is no touch subject touching the touch-control display screen, the touch detection unit 17 detects the value of the capacitance between the first sensing electrode 120 and the second sensing electrode 121 as Cp; if there is a touch subject touching the touch-control display screen, a capacitance Cf existed between the touch subject and each of the sensing electrodes is superimposed to the original capacitance existed between the first sensing electrode 120 and the second sensing electrode 121, then the touch detection unit 17 detects the value of the capacitance between the first sensing electrode 120 and the second sensing electrode 121 as Cp'=Cp//(Cf+Cf). It can be seen that the touch detection unit 17 judges whether there is a touch subject touching the touch-control display screen by detecting the value of the capacitance formed between the first sensing electrode 120 and the second sensing electrode 121, and calculates a position where the touch subject touches according to a corresponding algorithm.

Figure 4:
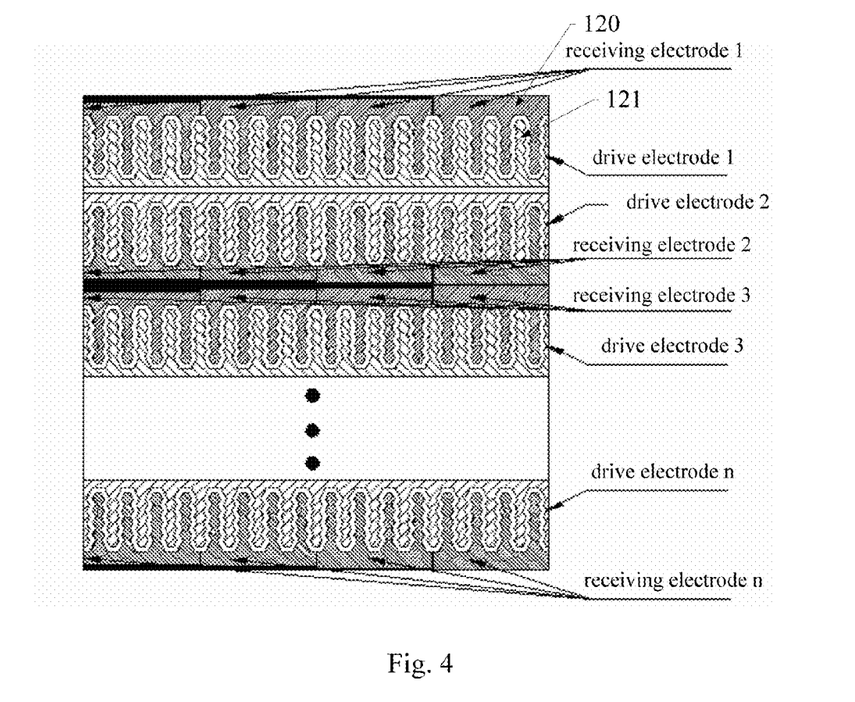
FIG. 4 is a pattern of a common electrode layer in another touch-control display screen provided in an embodiment according to the present invention.

(2) As shown in FIG. 4, the entire common electrode 12 may be divided into multiple first sensing electrodes 120 and multiple second sensing electrodes 121. The first sensing electrodes 120 and the second electrodes 121 may be in any shapes. For example, in FIG. 4, the first sensing electrode 120 is multiple strip-shaped electrodes with one terminal of each of the strip-shaped electrodes being connected together (the part filled with left oblique lines in FIG. 4), the second sensing electrode 121 is also multiple strip-shaped electrodes with one terminal of each of the strip-shaped electrodes being connected together (the part filled with right oblique lines in FIG. 4). Moreover, the first sensing electrode 120 and the second sensing electrode 121 are not connected together, and the unconnected portions of the strip-shaped electrodes of the first sensing electrode and the unconnected portions of the strip-shaped electrodes of the second sensing electrode are arranged to fit each other. That is, the unconnected portions of the strip-shaped electrodes included in one of the sensing electrodes are arranged in the interspaced portions of the other sensing electrode, so that the occupied area is saved. What FIG. 4 shows is only one of the specific implementations.

Figure 5:
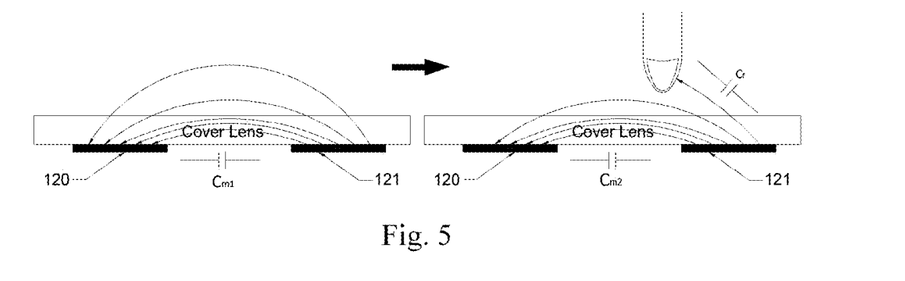
FIG. 5 is a schematic diagram of another capacitance formed between a first sensing electrode and a second sensing electrode when a touch detection unit operates in a touch-control display screen provided in an embodiment according to the present invention operates.

The touch detection unit 17 may provide a signal source for one of the first sensing electrode 120 and the second sensing electrode 121, and which operates as a drive electrode and the other sensing electrode without the signal source operates as a receiving electrode for receiving the signal, so that a mutual-capacitance is formed between the first sensing electrode 120 and the second sensing electrode 121. Specifically, the first sensing electrode 120 may act as the receiving electrode and the second sensing electrode 121 may act as the drive electrode. As shown in FIG. 5, if there is no touch subject touching the touch-control display screen, the touch detection unit 17 detects the value of the mutual-capacitance formed between the drive electrode and the receiving electrode as Cm1; if there is a touch subject touching the touch-control display screen, a capacitance Cf may be formed between the touch subject and the drive electrode, thus a part of the signal of the drive electrode is absorbed by the touch subject and the touch detection unit 17 may detect that the value of the mutual-capacitance formed between the drive electrode and the receiving electrode becomes smaller and is Cm2. It can be seen that the touch detection unit 17 judges whether there is a touch subject touching the touch-control display screen by detecting the value of the mutual-capacitance formed between the drive electrode and the receiving electrode, and calculates a position where the touch subject touches according to a corresponding algorithm.

It can be seen that, in the embodiments according to the present invention, the first sensing electrode and the second sensing electrode, which are included in the common electrode in the display electrodes of the liquid-crystal display screen with touch-control function, are connected to the touch detection unit. Furthermore, the touch detection unit and the display control unit operate in a timesharing manner. In this way, in the touch-control display screen, the common electrode may also be used as an electrode for detecting the touch on the touch-control display screen, without additionally arranging a touch sensing layer to carry the electrode for detecting the touch on the touch-control display screen. Therefore, the structure of the touch-control display screen is simplified. Moreover, the touch-control display screen has a better light transmittance since there is no touch sensing layer. Furthermore, the detecting for the touch and the control for the display may not interact with each other since the touch detection unit and the display control unit operate in a timesharing manner.

It should be noted that the common electrodes 12 in the touch-control display screen of the embodiment according to the present invention are electrodes divided into multiple blocks unconnected with each other. Therefore, an impedance of a single block of electrode is great. With the touch detection unit 17 and the display control unit 18 operating in a timesharing manner, the function of the common electrode 12 may also change in a timesharing manner. If the touch detection unit 17 is in the operating status, charging and discharging are performed continuously between the first sensing electrode 120 and the second sensing electrode 121 in the common electrode 12. If in such process the display control unit 18 is switched to be in the operating status, electric charges on the common electrode 12 may not be released timely due to the great impedance, thus a crosstalk may occur.

Figure 6:
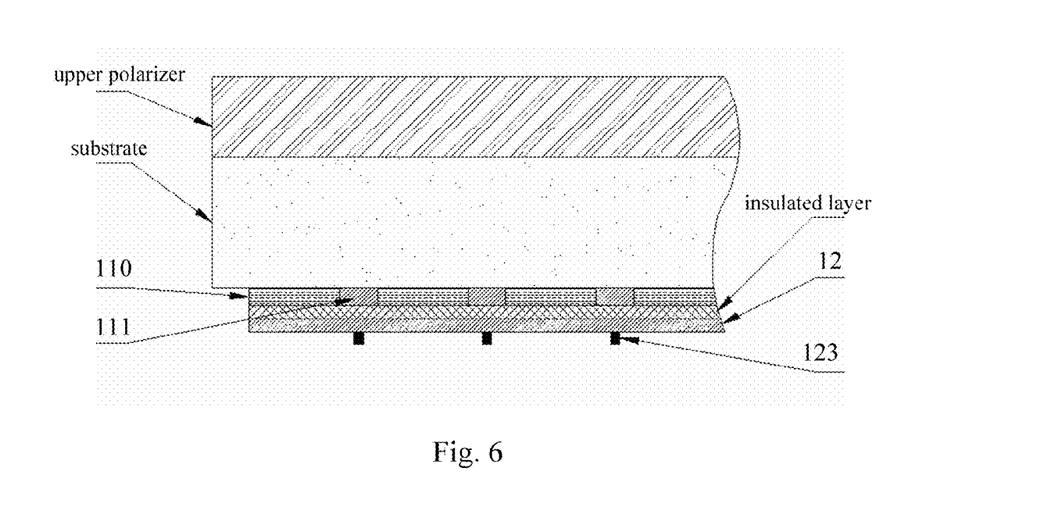
FIG. 6 is a sectional diagram of a partial structure in a touch-control display screen of an embodiment according to the present invention.
Figure 7:
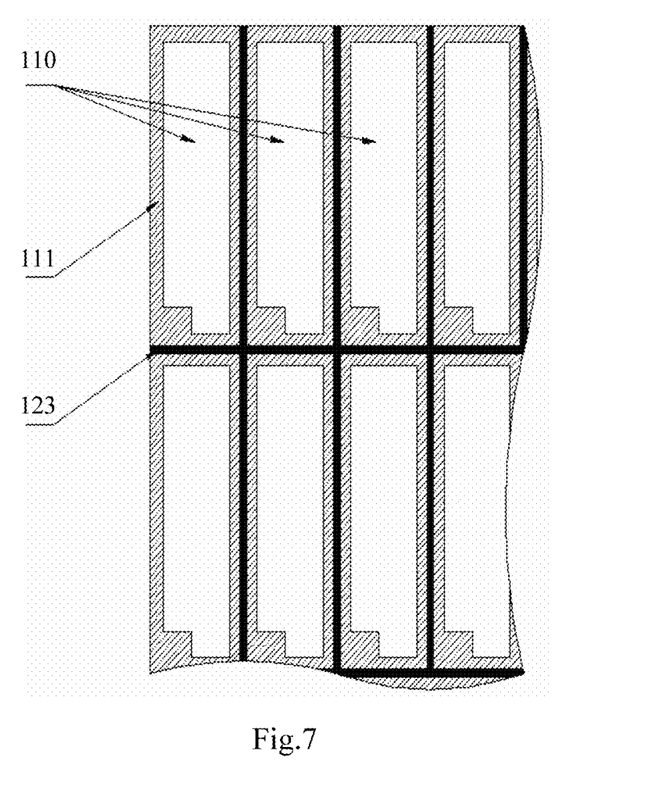
FIG. 7 is a plan diagram of a color light filter and a conductor grid which are in a touch-control display screen of an embodiment according to the present invention.
Figure 8:
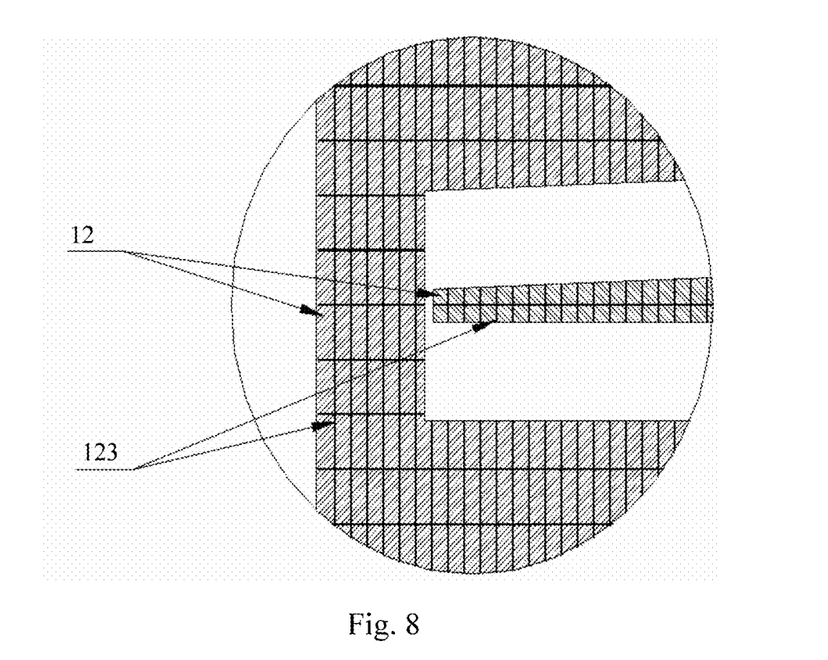
FIG. 8 is a schematic diagram of a relation between a common electrode and a conductor grid which are in a touch-control display screen of an embodiment according to the present invention.

FIG. 6 illustrates a sectional diagram of a partial structure in a touch-control display screen, and FIG. 7 illustrates a plan diagram of a color light filter and a conductor grid in a touch-control display screen. In order to eliminate the crosstalk, a conductor grid 123 is needed to be arranged below the common electrode 12, so as to provide a better conductivity for current conduction and to reduce the crosstalk caused due to the great impedance of the common electrode 12. The envelope of the conductor grid 123 is consistent with the shapes of the first sensing electrode 120 and the second sensing electrode 121 in the common electrode 12. That is, as shown in FIG. 8, there is the conductor grid 123 at a position below and corresponding to the first sensing electrode 120 and the second sensing electrode 121 in the common electrode 12 layer, and there is no conductor grid 123 at a position below and corresponding to a interspaced portion in the common electrode 12 layer. Moreover, in the color light filter 11 of the touch-control display screen, color light-filtering areas 110, such as a red light-filtering area, a green light-filtering area and a blue light-filtering area, separated by a black matrix 111 are generally included, so as to prevent colors displayed on the touch-control display screen from interfering with each other. The above-mentioned conductor grid 123 below the common electrode 12 needs to be arranged at a position corresponding to the black matrix 111, so that the conductor grid 123 may be obstructed by the black matrix 111, and a user can not see the conductor grid 123 from the top of the touch-control display screen. The conductor grid 123 may be grid-like, and may be made of a conductive material with good conductivity, such as metal or graphene.

Second Embodiment According to the Present Invention

Figure 9:
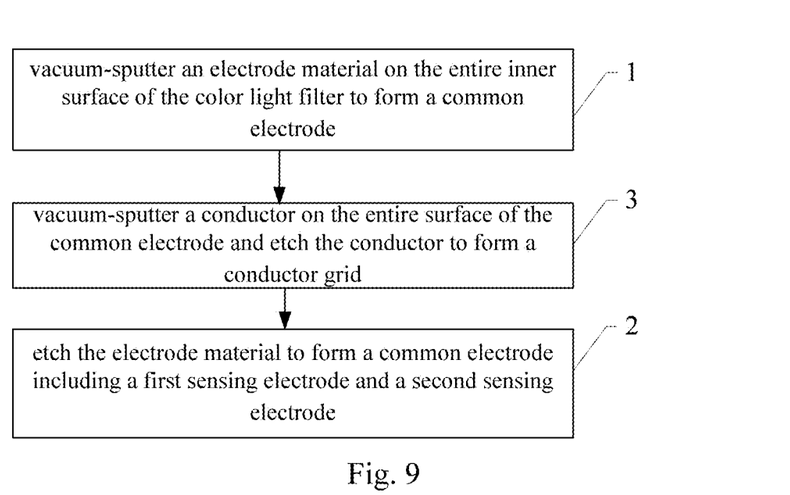
FIG. 9 is a flowchart of manufacturing a liquid-crystal display screen with touch-control function provided in a second embodiment according to the present invention.

There is provided a manufacturing method for the liquid-crystal display screen with touch-control function described in the first embodiment. A flowchart of the method is shown in FIG. 9, including:

1. vacuum-sputtering an electrode material such as ITO on the entire inner surface of the color light filter 11 to form a common electrode 12; alternatively, before vacuum-sputtering the ITO on the inner surface of the color light filter 11, vacuum-sputtering or coating an insulated flat layer on the entire inner surface of the color light filter 11, then sputtering the ITO; and 2. etching the electrode material such as ITO to form the common electrode 12 including a first sensing electrode 120 and a second sensing electrode 121. The patterns of the first sensing electrode 120 and the second sensing electrode 121 which are formed by etching is as described in the above-mentioned first embodiment and will not be described herein.

In order to eliminate the crosstalk, a conductor grid is needed to be arranged below the common electrode 12. In a specific embodiment, a step 3 is further needed to be performed before the above-mentioned step 2, that is, a conductor is vacuum-sputtered on the entire surface of the common electrode 12 formed in the step 1 and the conductor is etched to form the conductor grid 123. The etching of the conductor and the etching of the electrode material may be performed in a corresponding manner, so that the envelope of the conductor grid 123 is consistent with the shapes of the first sensing electrode 120 and the second sensing electrode 121.

Furthermore, in order to protect the common electrode 12 layer, a protective layer may be further vacuum-sputtered or coated on the entire surface of the common electrode 12 after the above-mentioned step 2 is finished.

Third Embodiment According to the Present Invention

There is provided an electronic apparatus, including a liquid-crystal display screen with touch-control function. The structure of the liquid-crystal display screen with touch-control function is as described in the above-mentioned first embodiment and will not be described herein.

Fourth Embodiment According to the Present Invention

Figure 10:
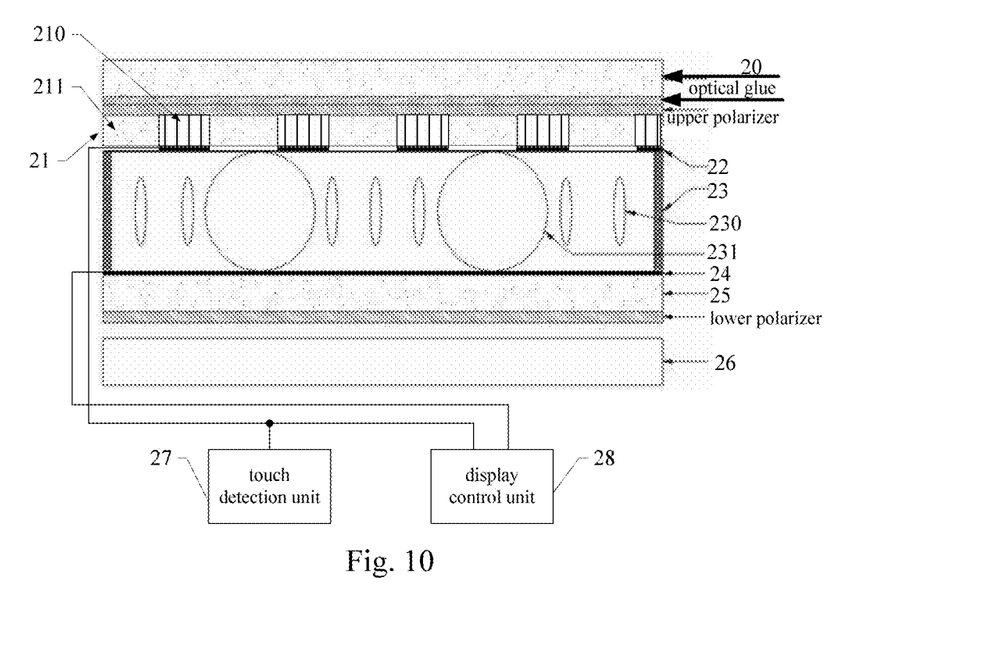
FIG. 10 is a schematic diagram of a structure of a liquid-crystal display screen with touch-control function provided in a fourth embodiment according to the present invention.

There is provided another liquid-crystal display screen with touch-control function (hereinafter referred to as a touch-control display screen for short). The touch-control display screen is mainly of an In-cell type and so on and is generally used in an electronic apparatus. Referring to FIG. 10, the touch-control display screen in the present embodiment including:

a cover plate 20, a color light filter 21, a common electrode 22 in display electrodes, a liquid-crystal layer, other display electrodes 24, a substrate 25 and a backlight 26, which are stacked from top to bottom. The touch-control display screen further includes a touch detection unit 27 and a display control unit 28. In order to change circularly polarized light into linearly polarized light to implement a liquid-crystal display, an upper polarizer is needed to be arranged between the cover plate 20 and the color light filter 21 and a lower polarizer is arranged between the backlight 26 and the substrate 25.

The color light filter 21 may allow a color picture to be displayed on the touch-control display screen and includes color light-filtering areas 211 separated by a black matrix 210. The color light-filtering areas 211 mainly include a red light-filtering area, a blue light-filtering area and a green light-filtering area. The liquid-crystal layer includes liquid-crystal molecules 230 and spacer particles 231. The liquid-crystal molecules 230 and the spacer particles 231 may be arranged between the common electrode 22 in the display electrodes and the other display electrodes 24 by frame glue 23. The spacer particles 231 may support the color light filter 21 to prevent the color light filter 21 from deforming and provide the liquid-crystal a certain space to rotate.

The common electrode 22 includes a first sensing electrode and a second sensing electrode, and for the common electrode 22 in the touch-control display screen of the embodiment, a conductor grid may be arranged below the black matrix 210 on the color light filter 21 in the touch-control display screen to act as the common electrode 22, without dividing the entire surface of the common electrode into different sensing electrodes. Such conductor grid may include a first sensing electrode and a second sensing electrode whose patterns are similar to the patterns of the first sensing electrode 120 and the second sensing electrode 121 described in the above-mentioned first embodiment and will not be described herein. Thus, comparing with the touch-control display screen in the first embodiment, the conductor grid for preventing the crosstalk is used as an electrode both for implementing the liquid-crystal display and for detecting a touch. An individual common electrode layer is not needed to carry these electrodes, so that the structure of the touch-control display screen is further simplified.

The first sensing electrode 120 and the second sensing electrode 121 are both connected to the touch detection unit 27. The touch detection unit 27 is adapted to detect a self-capacitance formed between the first sensing electrode 120 and the second sensing electrode 121 or a mutual-capacitance formed between the first sensing electrode 120 and the second sensing electrode 121, and to determine a touch on the touch-control display screen according to the detected self-capacitance or mutual-capacitance. The common electrode 22 and other display electrodes 24 are all connected to the display control unit 28. The display control unit 28 is adapted to control the first sensing electrode, the second sensing electrode and other display electrodes 24 to perform the liquid-crystal display. In the present embodiment, the touch detection unit 27 and the display control unit 28 may operate in a timesharing manner according to a preset arrangement.

In the process of manufacturing the touch-control display screen of the present embodiment, a conductor material such as metal or graphene may be vacuum-sputtered on the entire inner surface of the color light filter 21. Alternatively, before the conductor material is vacuum-sputtered on the inner surface of the color light filter 21, an insulated flat layer may be vacuum-sputtered or coated on the entire inner surface of the color light filter 21 and then the conductor material is sputtered. Then the conductor material is etched, so that the conductor grid at the position corresponding to the black matrix 210 in the color light filter 21 is arranged, and such conductor gird includes a first sensing electrode and a second sensing electrode. Thus the common electrode 22 is formed.

Furthermore, in order to protect the common electrode 22, a protective layer may also be vacuum-sputtered or coated on the entire surface of the common electrode 22 after the common electrode 22 is etched and formed.

In an embodiment according to the present invention, there is further provided an electronic apparatus mainly including the touch-control display screen described in the fourth embodiment and will not be described herein.

The liquid-crystal display screen with touch-control function and the manufacturing method thereof and the electronic apparatus, which are provided in the embodiments according to the present invention, are described in detail in the above. Specific examples are used herein to set forth the principle and embodiments of the present invention, and the above-mentioned description of the embodiments is only for helping to understand the method and the core concept of the present invention. Furthermore, for those skilled in the art, changes may be made to the specific embodiments and the application range according to the concept of the present invention. In summary, the specification should not be understood as limiting the present invention.

The invention claimed is:

1. A liquid-crystal display screen with touch-control function, comprising: a cover plate, a color light filter, a common electrode in display electrodes, a liquid-crystal layer, other display electrodes, a substrate and a backlight, which are stacked from top to bottom, the touch-control display screen further comprising a touch detection unit and a display control unit;

wherein the common electrode comprises a first sensing electrode and a second sensing electrode;

the first sensing electrode and the second sensing electrode are connected to the touch detection unit, the touch detection unit is adapted to detect a self-capacitance formed between the first sensing electrode and the second sensing electrode or a mutual-capacitance formed between the first sensing electrode and the second sensing electrode, and to determine a touch on the touch-control display screen according to the detected self-capacitance or mutual-capacitance;
the common electrode and the other display electrodes are all connected to the display control unit which is adapted to control the first sensing electrode, the second sensing electrode and the other display electrodes to perform a liquid-crystal display; and
the display control unit and the touch detection unit operate in a timesharing manner,
wherein the color light filter comprises color light-filtering areas separated by a black matrix; and
a conductor grid arranged throughout the surface of the first sensing electrode and the surface of the second sensing electrode, wherein the conductor grid is arranged at a position below the common electrode and corresponds to the black matrix, and the first sensing electrode and the second sensing electrode completely cover the conductor grid.

2. The liquid-crystal display screen with touch-control function according to claim 1, wherein
the first sensing electrode and the second sensing electrode are both multiple triangular electrodes with one edge of each of the triangular electrodes being connected together, the first sensing electrode and the second sensing electrode are not connected, and are arranged to fit each other; or,
the first sensing electrode and the second sensing electrode are both multiple strip-shaped electrodes with one terminal of each of the strip-shaped electrodes being connected together, the first sensing electrode and the second sensing electrode are not connected, and are arranged to fit each other.

3. The liquid-crystal display screen with touch-control function according to claim 1, wherein the conductor grid is made of metal or graphene.

4. The liquid-crystal display screen with touch-control function according to claim 2, wherein the conductor grid is made of metal or graphene.

5. The liquid-crystal display screen with touch-control function according to claim 1, wherein
the color light filter comprises color light-filtering areas separated by a black matrix; and
the common electrode is a conductor grid arranged below the black matrix.

6. The liquid-crystal display screen with touch-control function according to claim 2, wherein
the color light filter comprises color light-filtering areas separated by a black matrix; and
the common electrode is a conductor grid arranged below the black matrix.

7. An electronic apparatus, comprising a liquid-crystal display screen with touch-control function, the liquid-crystal display screen with touch-control function comprising: a cover plate, a color light filter, a common electrode in display electrodes, a liquid-crystal layer, other display electrodes, a substrate and a backlight, which are stacked from top to bottom, the touch-control display screen further comprising a touch detection unit and a display control unit;
wherein the common electrode comprises a first sensing electrode and a second sensing electrode;
the first sensing electrode and the second sensing electrode are connected to the touch detection unit, the touch detection unit is adapted to detect a self-capacitance formed between the first sensing electrode and the second sensing electrode or a mutual-capacitance formed between the first sensing electrode and the second sensing electrode, and to determine a touch on the touch-control display screen according to the detected self-capacitance or mutual-capacitance;
the common electrode and the other display electrodes are all connected to the display control unit which is adapted to control the first sensing electrode, the second sensing electrode and the other display electrodes to perform a liquid-crystal display; and
the display control unit and the touch detection unit operate in a timesharing manner,
wherein the color light filter comprises color light-filtering areas separated by a black matrix; and
a conductor grid arranged throughout the surface of the first sensing electrode and the surface of the second sensing electrode, wherein the conductor grid is arranged at a position below the common electrode and corresponds to the black matrix, and the first sensing electrode and the second sensing electrode completely cover the conductor grid.

8. The electronic apparatus according to claim 7, wherein
the first sensing electrode and the second sensing electrode are both multiple triangular electrodes with one edge of each of the triangular electrodes being connected together, the first sensing electrode and the second sensing electrode are not connected, and are arranged to fit each other; or,
the first sensing electrode and the second sensing electrode are both multiple strip-shaped electrodes with one terminal of each of the strip-shaped electrodes being connected together, the first sensing electrode and the second sensing electrode are not connected, and are arranged to fit each other.

9. The electronic apparatus according to claim 7, wherein the conductor grid is made of metal or graphene.

10. The electronic apparatus according to claim 7, wherein
the color light filter comprises color light-filtering areas separated by a black matrix; and
the common electrode is a conductor grid arranged below the black matrix.

11. A manufacturing method for a liquid-crystal display screen with touch-control function, the liquid-crystal display screen with touch-control function comprising: a cover plate, a color light filter, a common electrode in display electrodes, a liquid-crystal layer, other display electrodes, a substrate and a backlight, which are stacked from top to bottom, the touch-control display screen further comprising a touch detection unit and a display control unit; the common electrode comprising a first sensing electrode and a second sensing electrode; wherein the first sensing electrode and the second sensing electrode are connected to the touch detection unit, the touch detection unit is adapted to detect a self-capacitance formed between the first sensing electrode and the second sensing electrode or a mutual-capacitance formed between the first sensing electrode and the second sensing electrode, and to determine a touch on the touch-control display screen according to the detected self-capacitance or mutual-capacitance; the common electrode and the other display electrodes are all connected to the display control unit which is adapted to control the first sensing electrode, the second sensing electrode and the other display electrodes to perform a liquid-crystal display; the display control unit and the touch detection unit operate in a timesharing manner, wherein the color light filter comprises color light-filtering areas separated by a black matrix; and
a conductor grid is arranged throughout the surface of the first sensing electrode and the surface of the second sensing electrode, wherein the conductor grid is arranged at a position below the common electrode and corresponds to the black matrix, and the first sensing electrode and the second sensing electrode completely cover the conductor grid;

wherein the method comprises:

vacuum-sputtering an electrode material on the entire inner surface of the color light filter of the liquid-crystal display screen with touch-control function to form the common electrode;

vacuum-sputtering a conductor on the entire surface of the formed common electrode, and etching the conductor to form the conductor grid; and etching the electrode material to form the common electrode comprising the first sensing electrode and the second sensing electrode.

12. The manufacturing method according to claim 11, wherein the conductor grid is made of metal or grapheme.

13. A manufacturing method for a liquid-crystal display screen with touch-control function, the liquid-crystal display screen with touch-control function comprising: a cover plate, a color light filter, a common electrode in display electrodes, a liquid-crystal layer, other display electrodes, a substrate and a backlight, which are stacked from top to bottom, the touch-control display screen further comprising a touch detection unit and a display control unit; the common electrode comprising a first sensing electrode and a second sensing electrode; wherein the first sensing electrode and the second sensing electrode are connected to the touch detection unit, the touch detection unit is adapted to detect a self-capacitance formed between the first sensing electrode and the second sensing electrode or a mutual-capacitance formed between the first sensing electrode and the second sensing electrode, and to determine a touch on the touch-control display screen according to the detected self-capacitance or mutual-capacitance; the common electrode and the other display electrodes are all connected to the display control unit which is adapted to control the first sensing electrode, the second sensing electrode and the other display electrodes to perform a liquid-crystal display; the display control unit and the touch detection unit operate in a timesharing manner; the first sensing electrode and the second sensing electrode are both multiple triangular electrodes with one edge of each of the triangular electrodes being connected together, the first sensing electrode and the second sensing electrode are not connected, and are arranged to fit each other; or, the first sensing electrode and the second sensing electrode are both multiple strip-shaped electrodes with one terminal of each of the strip-shaped electrodes being connected together, the first sensing electrode and the second sensing electrode are not connected, and are arranged to fit each other, wherein the color light filter comprises color light-filtering areas separated by a black matrix; and a conductor grid is arranged throughout the surface of the first sensing electrode and the surface of the second sensing electrode, wherein the conductor grid is arranged at a position below the common electrode and corresponds to the black matrix, and the first sensing electrode and the second sensing electrode completely cover the conductor grid, wherein, the method comprises:

vacuum-sputtering an electrode material on the entire inner surface of the color light filter of the liquid-crystal display screen with touch-control function to form the common electrode;

vacuum-sputtering a conductor on the entire surface of the formed common electrode, and etching the conductor to form the conductor grid; and etching the electrode material to form the common electrode comprising the first sensing electrode and the second sensing electrode.

14. The manufacturing method according to claim 13, wherein the conductor grid is made of metal or grapheme.

* * * * *

UNITED STATES PATENT AND TRADEMARK OFFICE
CERTIFICATE OF CORRECTION

PATENT NO. : 9,557,594 B2
APPLICATION NO. : 13/942508
DATED : January 31, 2017
INVENTOR(S) : Lianghua Mo et al.

It is certified that error appears in the above-identified patent and that said Letters Patent is hereby corrected as shown below:

On the Title Page

Item (73) Assignee: change "FOCALTECH SYSTESM, LTD.," to -- FOCALTECH SYSTEMS, LTD., --

Signed and Sealed this
Third Day of October, 2017

Joseph Matal
*Performing the Functions and Duties of the*
*Under Secretary of Commerce for Intellectual Property and*
*Director of the United States Patent and Trademark Office*